United States Patent
Matsuno

(10) Patent No.: US 7,256,599 B2
(45) Date of Patent: Aug. 14, 2007

(54) PROTECTION CIRCUIT FOR SEMICONDUCTOR DEVICE AND SEMICONDUCTOR DEVICE INCLUDING THE SAME

(75) Inventor: Noriaki Matsuno, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 334 days.

(21) Appl. No.: 10/914,225

(22) Filed: Aug. 10, 2004

(65) Prior Publication Data

US 2005/0047047 A1 Mar. 3, 2005

(30) Foreign Application Priority Data

Aug. 28, 2003 (JP) ............... 2003-303823

(51) Int. Cl.
*G01R 31/02* (2006.01)
*H02H 3/32* (2006.01)

(52) U.S. Cl. .................... 324/763; 324/158.1

(58) Field of Classification Search ............. 324/158.1, 324/73.1, 763–765; 713/600; 726/34; 341/53; 361/88–90, 115
See application file for complete search history.

(56) References Cited

U.S. PATENT DOCUMENTS

| 5,406,630 | A | | 4/1995 | Piosenka et al. |
| 5,675,645 | A | | 10/1997 | Schwartz et al. |
| 5,892,369 | A | * | 4/1999 | Sourgen et al. ............. 324/765 |
| 5,986,284 | A | | 11/1999 | Kusaba et al. |
| 6,496,119 | B1 | * | 12/2002 | Otterstedt et al. .......... 340/653 |
| 7,080,001 | B2 | * | 7/2006 | Moriyama et al. .......... 713/600 |
| 2002/0126792 | A1 | | 9/2002 | Fuhrmann et al. |

FOREIGN PATENT DOCUMENTS

| JP | 58-209136 | 12/1983 |
| JP | 05-047766 | 2/1993 |
| JP | 5-167020 | 7/1993 |
| JP | 2001-141783 A | 5/2001 |
| JP | 2001-144255 A | 5/2001 |
| JP | 2001-166009 A | 6/2001 |
| JP | 2001-177064 A | 6/2001 |
| JP | 2001-244414 A | 9/2001 |
| JP | 2002-529928 | 9/2002 |

* cited by examiner

*Primary Examiner*—Vinh P. Nguyen
(74) *Attorney, Agent, or Firm*—McDermott Will & Emery LLP

(57) ABSTRACT

A protection circuit comprises: at least one shielded line arranged to cover an area to be protected over a semiconductor device, the at least one shielded line having only one route from a start point to an end point; a signal generator for applying a signal to the start point of the shielded line; a counter which starts measurement of time in response to application of the signal to the start point of the shielded line by the signal generator and which ends measurement of the time in response to arrival of the signal at the end point of the shielded line; and a comparator for comparing the time measured by the counter with a reference value to output a fraud detection signal according to a result of the comparison.

8 Claims, 13 Drawing Sheets c  Input pulses to shielded line pair
d  Pulses immediately before phase comparator
e  Output of phase comparator
f  Output of filter circuit

PROTECTION CIRCUIT FOR SEMICONDUCTOR DEVICE AND SEMICONDUCTOR DEVICE INCLUDING THE SAME

CROSS-REFERENCE TO RELATED APPLICATION

This application claims priority under 35 U.S.C. §119(a) on Japanese Patent Application No. 2003-303823 filed on Aug. 28, 2003, the entire contents of which are hereby incorporated by reference.

BACKGROUND OF THE INVENTION

1. Field of the Invention

The present invention relates to a protection circuit for protecting confidential information stored in a semiconductor device from fraudulent analysis and to a semiconductor device including such a protection circuit.

2. Background Art

In recent years, circuitry information and internal information of semiconductor devices require a considerably high level of confidentiality and secrecy. Especially in the field of IC cards, the safety of semiconductor devices is an essential feature and, therefore, it is necessary to protect important information from fraudulent analysis and prevent tampering and copying of internal information. In view of such, an increasing number of methods for achieving such heavy protection have been proposed. Hereinafter, a typical one of such conventional techniques is described.

FIG. 14 shows the structure of a conventional protection circuit. In FIG. 14, reference numeral 140 denotes a shielded line, reference numeral 141 denotes a signal generator, reference numeral 142 denotes a detector, reference numeral 143 denotes a reference line, and reference numeral SO denotes an alarm signal. In this protection circuit, the shielded line 140 is provided over an integrated circuit to be protected. The signal generator 141 gives a signal to the shielded line 140 and the reference line 143. The signal supplied from the signal generator 141 reaches the detector 142 after passing through the shielded line 140 and the reference line 143. The detector 142 compares the signal supplied through the shielded line 140 and the signal supplied through the reference line 143. If a difference is found, the detector 142 outputs the alarm signal SO. In response to the alarm signal SO, the integrated circuit to be protected shifts to the safety mode such that fraudulent analysis and tampering are practically impossible (see, for example, Japanese Unexamined PCT National-Phase Patent Publication No. 2002-529928 (FIG.1)).

SUMMARY OF THE INVENTION

The above-described conventional technique is vulnerable to the fraudulent means for re-connecting partially-broken or peeled shielded line through a bypass that does not inhibit physical analysis by using appropriate means, such as a FIB processing technique, or the like, and the fraudulent means for externally connecting a conductive path as a bypass to a shielded line to disable the abnormality detecting function.

An objective of the present invention is to provide a protection circuit having improved tamper resistance and a semiconductor device including such a protection circuit.

In order to achieve the above objective, it is only necessary to realize a protection circuit in which the physical characteristics of a shielded line are monitored, and a variation in the physical characteristics can be detected as a tampering of a shielded line route. However, the physical characteristics of the shielded line are determined by the shape and the electric characteristic state of an underlying layer to be protected and, therefore, it is difficult to form a precise model of the physical characteristics of the shielded line in the designing process. Additionally, because of an error in the production, a characteristic variation within a guaranteed operating environment, etc., it is difficult to readily realize such a protection circuit. A protection circuit of the present invention overcomes such problems and is readily realized and has further improved tamper resistance.

A protection circuit of the present invention comprises: at least one shielded line arranged to cover an area to be protected over a semiconductor device, the at least one shielded line having only one route from a start point to an end point; a signal generator for applying a signal to the start point of the shielded line; a counter which starts measurement of time in response to application of the signal to the start point of the shielded line by the signal generator and which ends measurement of the time in response to arrival of the signal at the end point of the shielded line; and a comparator for comparing the time measured by the counter with a reference value to output a fraud detection signal according to a result of the comparison.

The above protection circuit measures the propagation time of a signal transition which passes through the shielded line. The propagation time measured when the shielded line is in a normal state is stored in a nonvolatile memory as a reference value. Relative comparison with the reference value realizes detection of a tampering of the shielded line route.

In the first place, a signal transition is transmitted from the signal generator to the start point of the shielded line. The time consumed till the signal transition arrives at the end point of the shielded line is counted by a counter, and the counted value is stored in a nonvolatile memory as normal state information (reference value). The signal transition delay time is measured anew at the start-up of a semiconductor device or at the time when the semiconductor device is in a stand-by state, the count value of the normal state stored in advance in the nonvolatile memory is referred to, and a comparison operation is performed by the comparator in consideration of a variation in the physical characteristics of the shielded line within the guaranteed operating environment as a tolerance. In this way, a protection circuit in which a tampering of the shielded line is readily detected is realized. The protection circuit detects the fraudulent activity of re-connecting partially-broken or peeled shielded line through a bypass that does not inhibit physical analysis by using a FIB processing technique or any other appropriate means, or the fraudulent activity of externally connecting a conductive path as a bypass to a shielded line, whereby the above problems are solved.

The protection circuit further includes a dedicated oscillator for supplying a pulse to a counter. With the dedicated oscillator, the frequency of the pulse can be set to any frequency, and the accuracy of time measurement can be freely set. The basic clock of a semiconductor device is, in general, externally supplied and, therefore, there is a possibility that the fraudulent means for adjusting the cycle of an external clock to adapt the count number of the pulse is devised. However, due to the dedicated oscillator provided inside the semiconductor device, it is difficult to externally change the cycle of the pulse. Thus, the tamper resistance is considerably improved.

Another protection circuit of the present invention comprises: at least one shielded line pair arranged to cover an area to be protected over a semiconductor device, the at least one shielded line pair including two shielded lines which has the same shape and the same length, and each shielded line has only one route from a start point to an end point; a signal generator for applying a potential to the start points of the shielded lines of the shielded line pair; and a detector for comparing a potential difference between the end points of the shielded lines of the shielded line pair with a reference value to output a fraud detection signal according to a result of the comparison.

The above protection circuit features the function of detecting a tampering of the shielded line by monitoring an offset variation in the resistive characteristic of the two shielded lines having the same physical characteristics.

Two shielded lines having the same shape and the same wiring length are paired into a shielded line pair, whereby the resistive characteristic of the shielded line pair is made uniform. A certain level of voltage is supplied from a constant voltage source, and a difference in the resistive characteristic of the shielded line pair is converted by an operational amplifier to a voltage as an offset. A voltage determined in consideration of the initial offset of the operational amplifier is generated as a reference voltage by another constant voltage source and compared with the extracted offset voltage, whereby a protection circuit in which a tampering of the shielded line is readily detected is realized. The protection circuit detects the fraudulent activity of re-connecting partially-broken or peeled shielded line through a bypass that does not inhibit physical analysis by using a FIB processing technique or any other appropriate means, or the fraudulent activity of externally connecting a conductive path as a bypass to a shielded line, whereby the above problems are solved.

Further, a semiconductor resistor which has the same resistance value as that of a shielded line of one route is provided, and the shielded line and the semiconductor resistor are connected as the inputs to the operational amplifier, whereby the shielded line structure is readily realized. Since one of the shielded line pair is a semiconductor resistor protected by the shielded line, it is difficult to externally change the resistance value of the semiconductor resistor even though the route of the shielded line pair is accidentally or intentionally changed, e.g., the shielded line pair is re-connected to have such a route that a pair of two shielded lines have the same resistance characteristics. Thus, the tamper resistance is greatly improved.

Still another protection circuit of the present invention comprises: at least one shielded line pair arranged to cover an area to be protected over a semiconductor device, the at least one shielded line pair including two shielded lines which has the same shape and the same length, and each shielded line has only one route from a start point to an end point; a signal generator for applying in-phase pulses to the start points of the shielded lines of the shielded line pair; and a detector for comparing a phase difference between the end points of the shielded lines of the shielded line pair with a reference value to output a fraud detection signal according to a result of the comparison.

The above protection circuit features the function of supplying in-phase pulses onto two shielded lines having the same physical characteristics and comparing the phase difference of the pulses to detect a tampering of the shielded lines.

The pulse generator simultaneously applies in-phase pulses having a certain pulse width to the shielded line pair. A phase comparator extracts the phase difference between the pulses of the two shielded lines as a pulse. A filter circuit removes the initial phase difference which corresponds to a production error, and an unremoved pulse is detected, whereby a protection circuit in which a tampering of the shielded line is readily detected is realized. The protection circuit detects the fraudulent activity of re-connecting partially-broken or peeled shielded line through a bypass that does not inhibit physical analysis by using a FIB processing technique or any other appropriate means, or the fraudulent activity of externally connecting a conductive path as a bypass to a shielded line, whereby the above problems are solved.

The above protection circuit basically monitors and assesses a shielded line or shielded line pair of one route. In order to monitor a plurality of routes at one time, a plurality of detection sections are necessary, and accordingly, the layout area increases. By monitoring on a one-route by one-route basis while a switching circuit switches the route of shielded line or shielded line pair, the detection section for one route can be shared by all of the routes, and accordingly, the layout area can be decreased. Further, as for the signals supplied to the shielded line or shielded line pair from the signal generator, a true signal is supplied to a route to be detected whereas a pseudo signal is applied to the other routes, and the true signal supply route is changed according to switching of routes by the switching circuit, whereby external observation of the signal on the shielded line and specifying of the signal pattern are made difficult. Thus, the tamper resistance is further improved.

In the above protection circuit, a plurality of shielded line pairs, each including two shielded lines having the same physical characteristics, are prepared and in-phase pulses and pulses having a phase difference therebetween are applied to each pair. The phase difference may be encoded and converted to a signal pattern for comparison with a reference signal pattern.

The in-phase pulses and pulses having a sufficient phase difference therebetween are sorted according to a signal pattern from the signal pattern generator for each shielded line pair through the switching circuit and forced to pass through a phase comparator and a filter circuit for removing the initial phase difference, whereby the in-phase pulses and the pulses having a sufficient phase difference are converted to a signal pattern of 0 and 1 and supplied to the comparator. The reference signal pattern is sent from the signal pattern generator to the comparator for comparison through a line protected by the shielded line, whereby a protection circuit in which a tampering of the shielded line is readily detected is realized. The protection circuit detects the fraudulent activity of re-connecting partially-broken or peeled shielded line through a bypass that does not inhibit physical analysis by using a FIB processing technique or any other appropriate means, or the fraudulent activity of externally connecting a conductive path as a bypass to a shielded line, whereby the above problems are solved.

This protection circuit overcomes the vulnerability in phase difference detection to accidental or intentional application of external in-phase signals to all of the shielded lines. Further, even if a signal on the shielded line is externally observed by changing the signal pattern every time, it is difficult to imitate the signal. Thus, the tamper resistance is considerably improved.

Further, the signal pattern generator is formed by a random number generator, whereby a fraudulent activity based on external observation of the signal on the shielded line is made difficult. Thus, the tamper resistance is further improved.

In the above protection circuit, the tampering detection in the shielded line is separately performed for tampering of a route and breakage, peeling, and short-circuiting using different detection means, whereby the tamper resistance is further improved.

The signal generator supplies a signal of 0 or 1 for each route of the shielded line to a match/mismatch determinator through a switching circuit. Meanwhile, the signal generator supplies a comparison signal to the match/mismatch determinator through a line protected by the shielded line for match/mismatch determination, whereby abnormality in the shielded line, such as breakage, peeling, or short-circuiting of the shielded line, is detected. Further, comparison is repeated a plurality of times while the signal supplied by the signal generator is inverted or changed every time, whereby external observation of a signal on the shielded line and accidental coincidence with a signal externally supplied to the shielded line are made difficult. If no abnormality is detected by any of the above detection methods, the switching circuit is switched to detect a tampering of the shielded line route by any of the above protection circuits. The protection circuit detects the fraudulent activity of re-connecting partially-broken or peeled shielded line through a bypass that does not inhibit physical analysis by using a FIB processing technique or any other appropriate means, or the fraudulent activity of externally connecting a conductive path as a bypass to a shielded line, whereby the above problems are solved. Further, since different detection means are used in combination, various types of fraudulent analytic activities become more difficult to commit. Thus, the tamper resistance is improved.

The signal pattern generator is formed by a random number generator, whereby a fraudulent activity based on external observation of the signal on the shielded line is made difficult. Thus, the tamper resistance is further improved.

In the above protection circuit, a failure diagnosis section sends several patterns of information that are to be determined as being abnormal or normal to the detector through a line protected by the shielded line on an abbreviated basis. A fraud detection signal output from the detector is assessed by the failure diagnosis section. With such a method, a failure of the detector or a fraudulent activity on the detector may be detected. Even if the node of a fraud detection signal of the protection circuit is specified, the shielded line or shielded line pair is peeled, and a fixed voltage which always indicates normality is applied to the fraud detection node, a protection circuit of the present invention which has improved tamper resistance has sufficient protection effects against such a fraudulent activity.

Preferably, the shielded line (pair) in the protection circuit is arranged to cover the entire semiconductor device region except for PAD. With this structure, it becomes difficult to commit a fraudulent activity on the semiconductor device without peeling the shielded line. Further, the minimum wire width and minimum wiring interval which are allowed in the production process are employed, whereby it becomes difficult, even with a FIB processing technique, to form a hole between the shielded lines or over the shielded line without breaking the shielded line(s) and form PAD having a connection with an underlying layer. At the same time, it is difficult to place a terminal because the width of the shielded line is sufficiently smaller than that of a microprobe terminal. Further, external connection to the shielded line is also difficult. Furthermore, the shielded wiring route is arranged to have a complicated shape and route which is realized by 90°-wiring arrangement or 45°-wiring arrangement or by setting the traveling direction to the 45°-direction using 90°-wiring arrangement, or by using the combinations thereof, whereby tracing of the shielded line route becomes difficult. With the above features, a protection circuit having greatly-improved tamper resistance can be provided.

A semiconductor device of the present invention incorporates the above-described protection circuit for performing the operation of monitoring a tampering of a shielded line. In the case where an abnormality is detected, a fraud detection signal is output to prevent fraudulent analysis on the semiconductor device and tampering of information. With this structure, the tamper resistance is improved.

The semiconductor device shifts according to the fraud detection signal to a mode in which the operation is fixed, such as a reset mode, or the like, and which is canceled by interrupting the power supply. Thereafter, if a tampering of the shielded line is detected several times in series, control is performed such that a memory content is deleted, whereby deletion of the memory content and disability of restarting caused by misdetection due to a variation in the physical characteristics of the semiconductor device, which may be caused by any factor resulting from a variation in the operating environment or external disturbance, can be avoided. Thus, the practical usefulness of the semiconductor device is further improved.

According to the present invention, a protection circuit with improved tamper resistance which has the function of detecting a tampering of the shielded line which covers a semiconductor device is readily realized. In a semiconductor device incorporating the protection circuit, confidential information stored in the semiconductor device is protected from fraudulent analysis means. Thus, a semiconductor device having an improved confidentiality protection function is readily provided.

DESCRIPTION OF THE PREFERRED EMBODIMENTS

Figure 1:
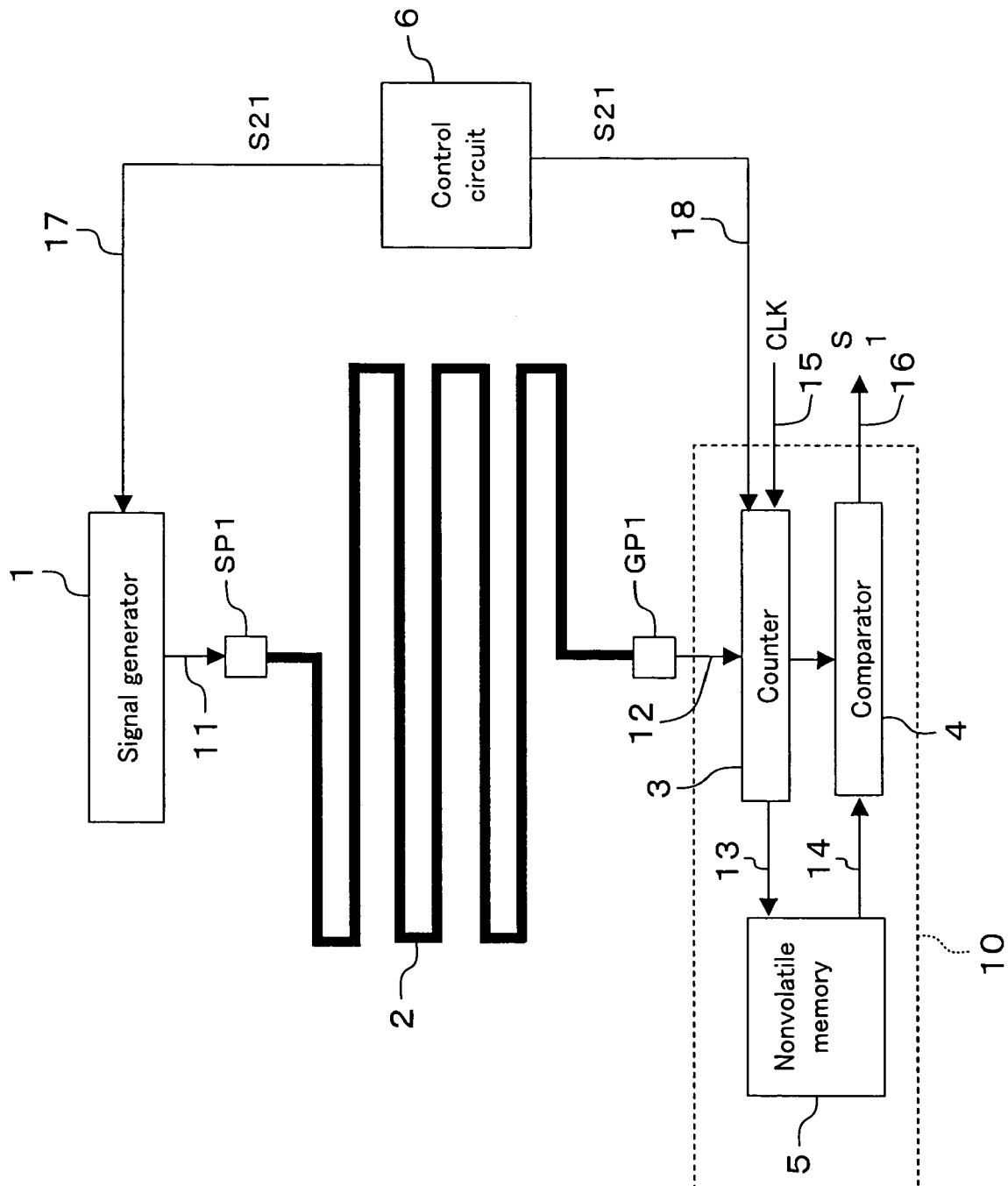
FIG. 1 shows the structure of a protection circuit according to embodiment 1.

Hereinafter, embodiments of the present invention will be described in detail with reference to the drawings. Throughout the drawings, like or equivalent elements are denoted by like reference numerals, and therefore, descriptions thereof are not repeatedly provided.

Embodiment 1

FIG. 1 shows the structure of a protection circuit according to embodiment 1. The protection circuit is incorporated in a semiconductor device for protecting confidential information stored in the semiconductor device from an analytic activity committed through fraudulent means. The protection circuit of embodiment 1 includes a signal generator 1, a shielded line 2, a control circuit 6 and a detector 10. The detector 10 includes a counter 3, a comparator 4 and a nonvolatile memory 5.

The shielded line 2 is the uppermost layer made of a metal in the production of a semiconductor device and is provided to cover a necessary and sufficient semiconductor device area to be protected (protection area). The shielded line 2 is arranged based on a unicursal topology to have only one course from a start point SP1 to an end point GP1. The control circuit 6 supplies control signal S21 to the signal generator 1 and the counter 3. In response to control signal S21 from the control circuit 6, the signal generator 1 gives a signal transition from 0 to 1 or from 1 to 0 to the start point SP1 of the shielded line 2. The counter 3 starts counting clock pulse CLK in response to control signal S21 from the control circuit 6 and ends the counting of clock pulse CLK in response to arrival of a signal transition at the end point GP1 of the shielded line 2. After the end of counting, the counter 3 supplies a count value to the nonvolatile memory 5 or comparator 4. The nonvolatile memory 5 stores the count value from the counter 3 as a reference value. The comparator 4 compares the count value from the counter 3 with the reference value stored in the nonvolatile memory 5 and outputs fraud detection signal S1 according to a result of the comparison.

Figure 2:
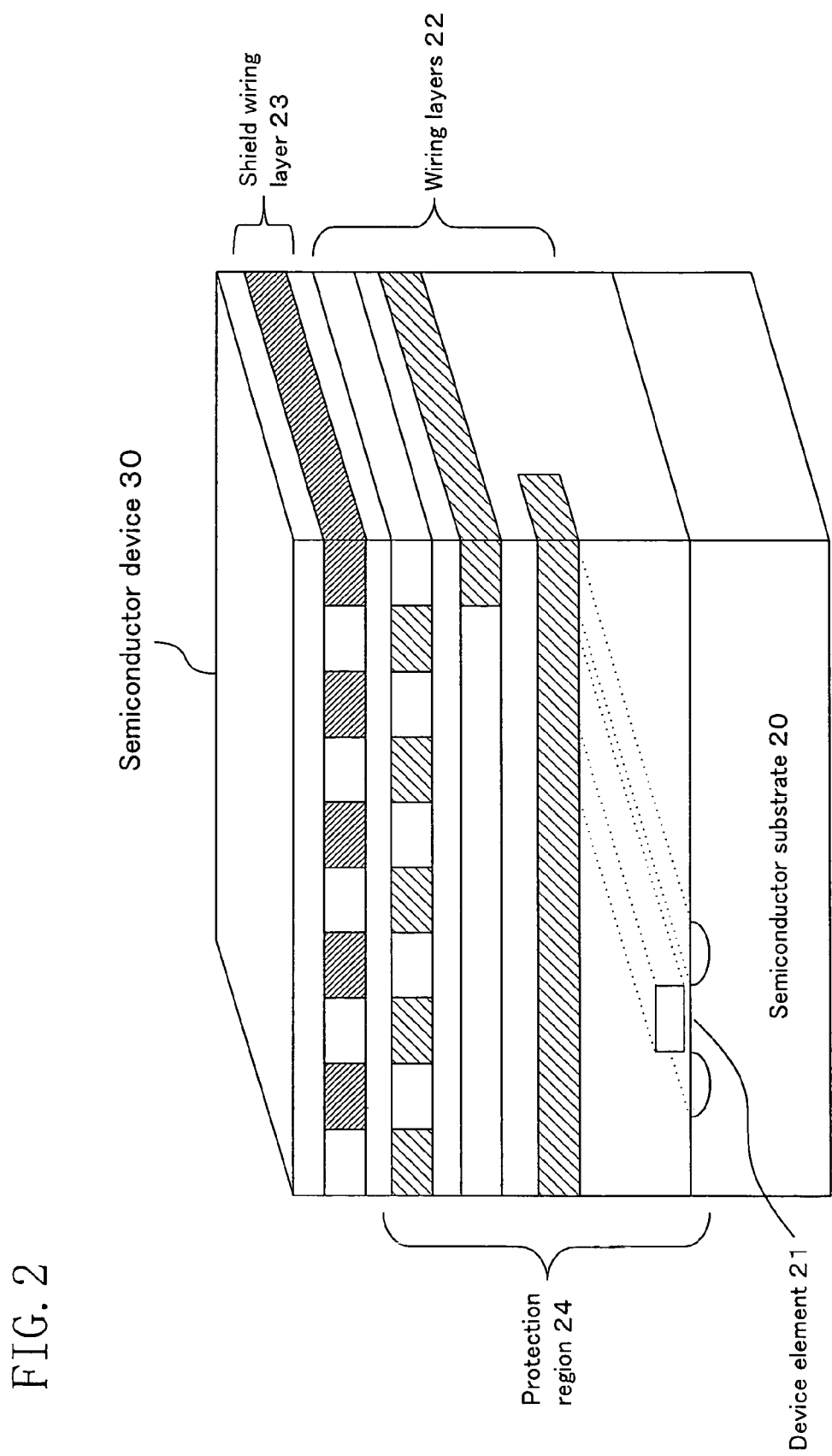
FIG. 2 schematically shows a cross-sectional structure of a semiconductor device which incorporates the protection circuit of FIG. 1.

FIG. 2 shows a general cross-sectional structure of a semiconductor device incorporating the protection circuit of FIG. 1. In the semiconductor device 30 shown in FIG. 2, a device element 21 is provided on a semiconductor substrate 20, a plurality of wiring layers 22 are provided over the device element 21, and a shield wiring layer 23 is provided in the uppermost layer. The shielded line 2 shown in FIG. 1 is included in the shield wiring layer 23 and arranged so as to cover a protection region 24 (including the device element 21 and the wiring layers 22). The circuit elements that constitute the signal generator 1, the counter 3, the comparator 4, the nonvolatile memory 5 and the control circuit 6 shown in FIG. 1 are formed by the device element(s) 21, and lines 11 to 18 (FIG. 1) are formed by the wiring layers 22. That is, the signal generator 1, the counter 3, the comparator 4, the nonvolatile memory 5 and the control circuit 6 and the lines 11 to 18 connecting these elements are protected by the shielded line 2.

Figure 3:
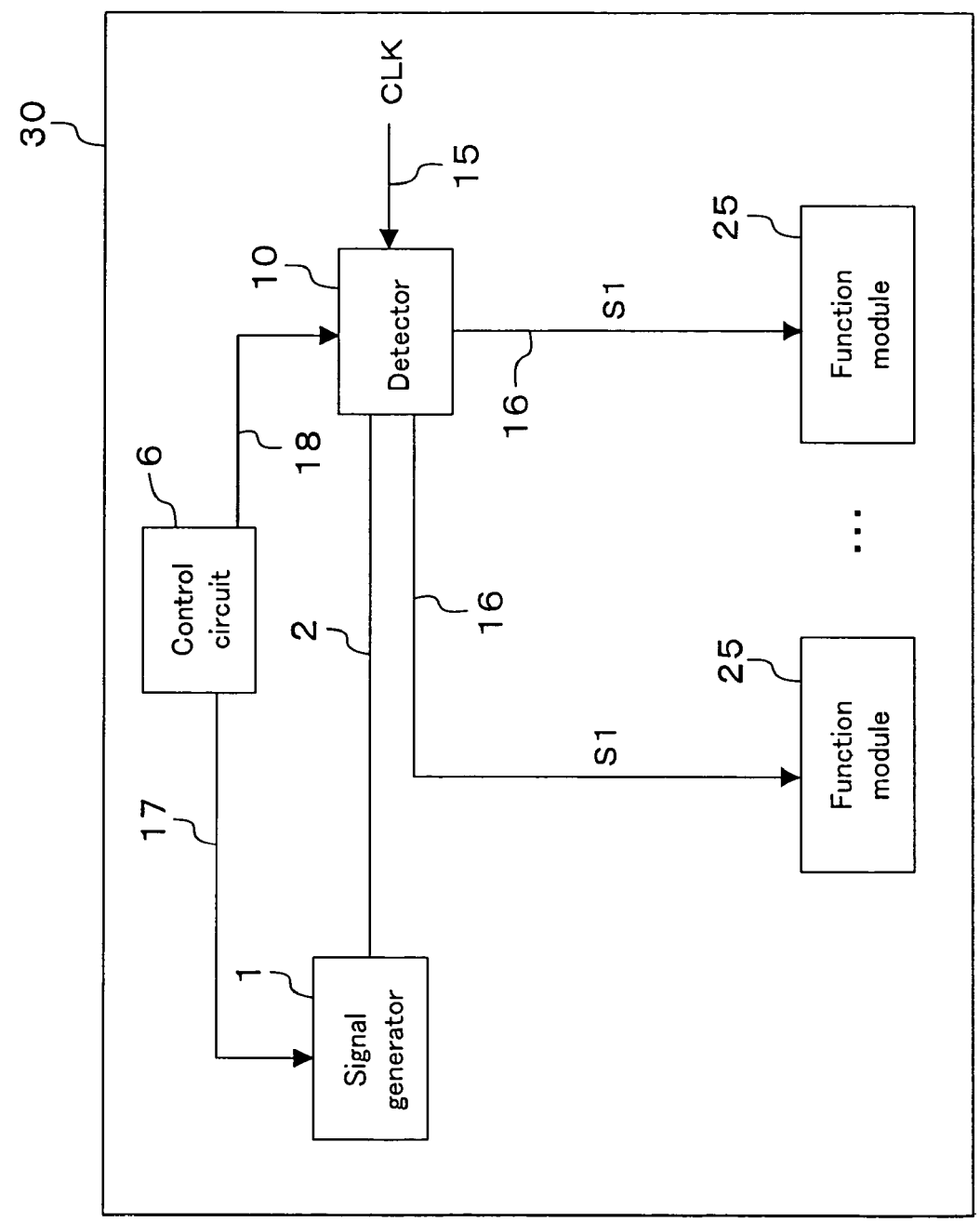
FIG. 3 shows a general structure of the semiconductor device of FIG. 2.

Fraud detection signal S1 output from the detector 10 of the protection circuit is supplied to a function module 25 of the semiconductor device 30 as shown in FIG. 3. The circuit elements that constitute the function modules 25 are formed by the device element(s) 21, and lines for connecting these elements are formed by the wiring layers 22. That is, the function modules 25 are protected by the shielded line 2.

Next, the operation of the protection circuit having the above-described structure is described.

In the inspection process at a manufacturer's factory, a signal transition from 0 to 1 or from 1 to 0 is supplied from the signal generator 1 to the start point SP1 of the shielded line 2. The counter 3 counts clock pulse CLK in the semiconductor device till the signal transition reaches the counter 3 through the shielded line 2. The obtained count value is stored in the nonvolatile memory 5 as reference information.

After shipment, a signal transition from 0 to 1 or from 1 to 0 is supplied from the signal generator 1 to the start point SP1 of the shielded line 2. The counter 3 counts clock pulse CLK till the signal transition reaches the counter 3 through the shielded line 2. The comparator 4 compares the obtained count value with the reference information which has been stored in advance in the nonvolatile memory 5. If the count value does not match the reference information, the comparator 4 outputs fraud detection signal S1. In the comparison process, the function of considering a variation in the physical characteristics of the shielded line 2 within a guaranteed operating environment in the comparison calculation is added. For example, the comparator 4 is provided with the function of creating upper and lower limit values in view of errors for the reference information by addition/subtraction, bit shifting, or the like, and determining measured information (the count value obtained by the counter 3) within the range between the upper and lower limit values as being normal. Performing addition/subtraction or bit shifting in the measurement of reference information and storing resultant upper and lower limit values in the nonvolatile memory 5 is an alternative favorable method. With the above-described features, embodiment 1 readily achieves tampering detection in the shielded line 2.

Figure 4:
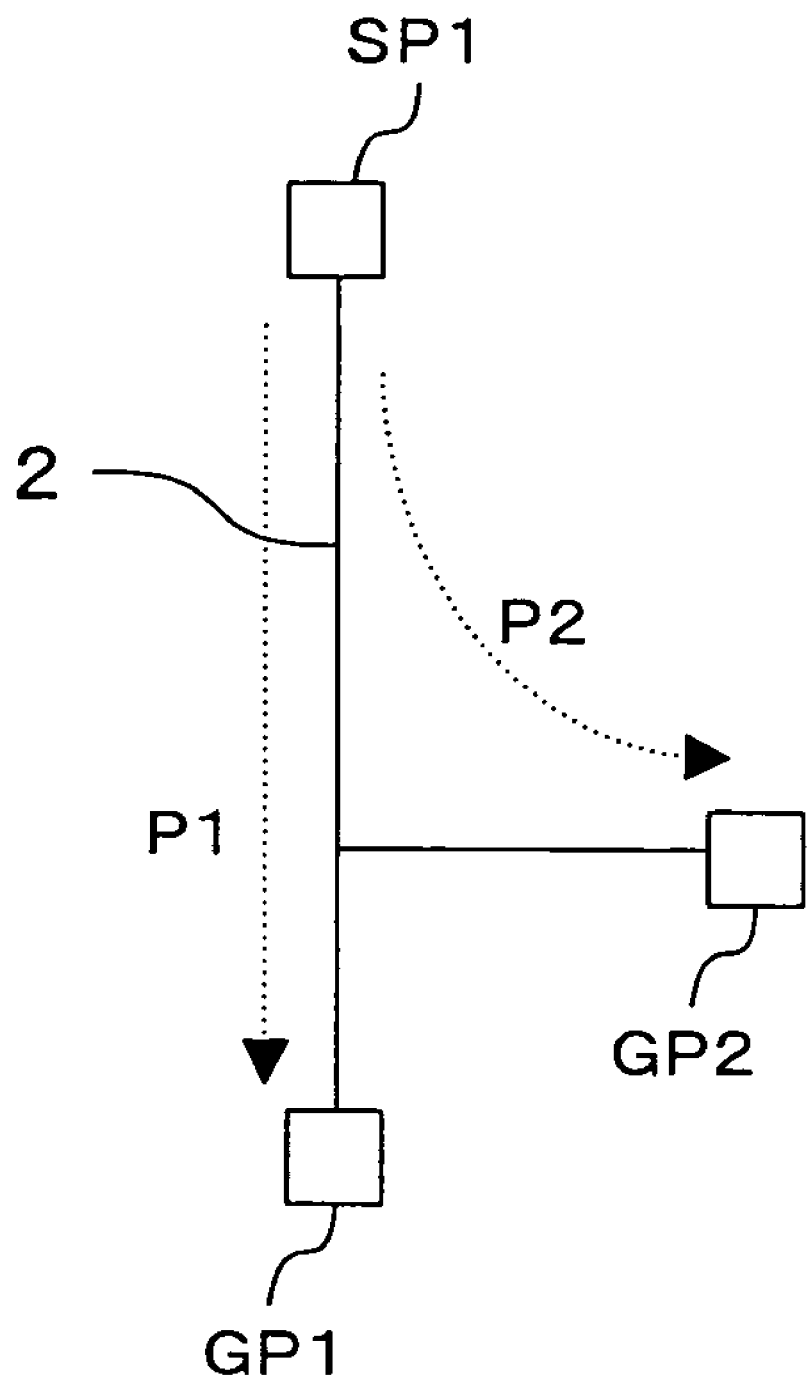
FIG. 4 shows a wiring example of a shielded line.

In the above example, the shielded line 2 is a single line. However, a plurality of shielded lines 2 may be provided, and the signal generator 1 and the detector 10 are provided to each shielded line 2. Alternatively, the shielded line 2 may be branched at the middle of the line as shown in FIG. 4, and the detector 10 is provided to each of end points GP1 and GP2. In this case, although there is a plurality of routes for the shielded line 2 (P1 and P2 in this example), there is only one route from the start point SP1 to the end point GP1 as for route P1, and there is only one route from the start point SP1 to the end point GP2 as for route P2. In this way, a plurality of detectors 10 may be appropriately distributed such that a fraudulent activity based on external physical characteristic measurement is made difficult, and accordingly, the tamper resistance is improved.

Figure 5:
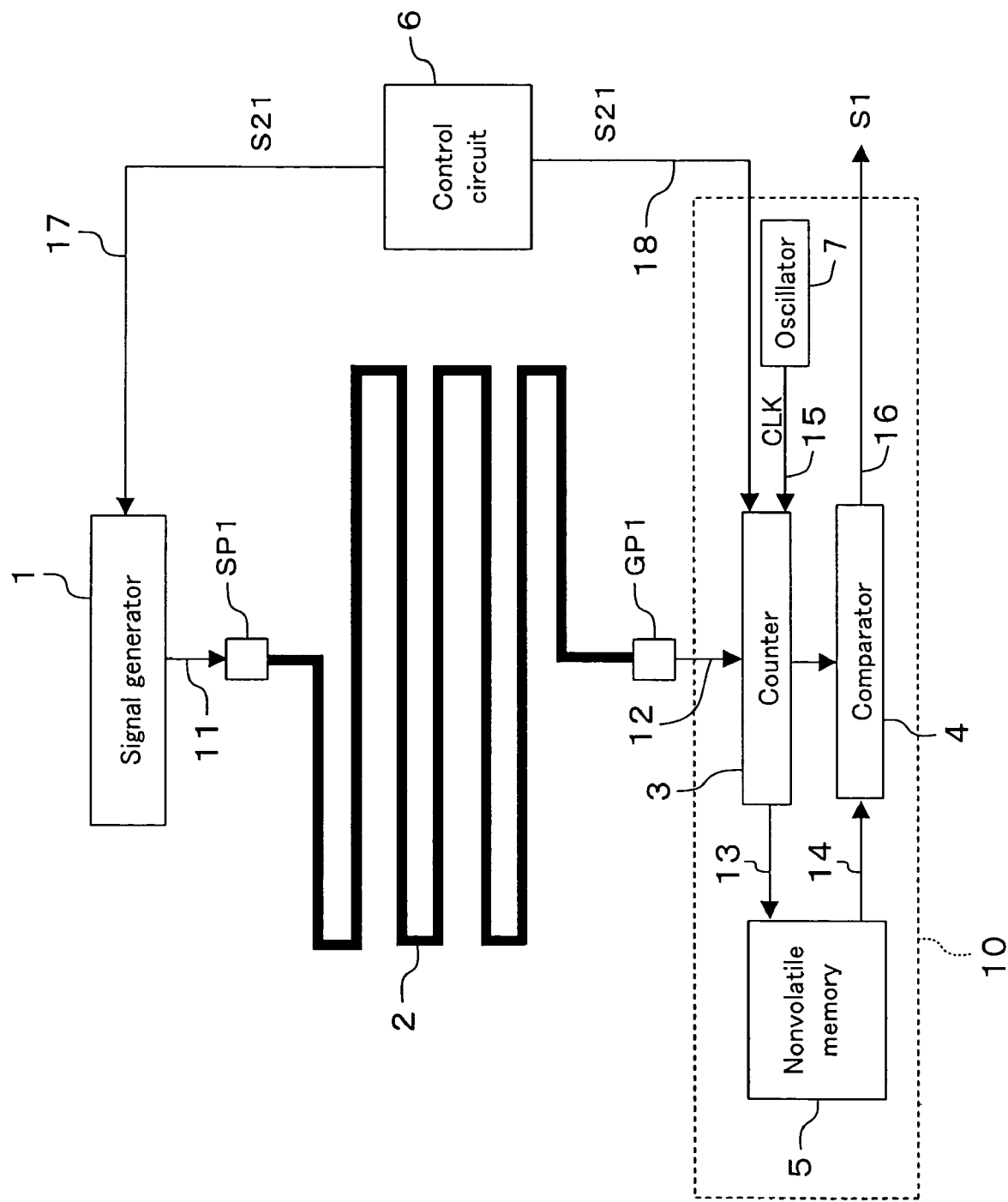
FIG. 5 shows a variation of the protection circuit of FIG. 1.

Alternatively, clock pulse CLK may be supplied from a dedicated oscillator 7 to the counter 3 as shown in FIG. 5. The cycle of pulse CLK is set to any cycle in the oscillator 7, whereby the measurement accuracy for the signal transition delay time is freely determined. Typically, a basic clock of a semiconductor device is supplied externally, and therefore, there is a possibility that the fraudulent means for adjusting the cycle of an external clock to adapt the count number of the pulse is devised. However, due to the dedicated oscillator 7 provided inside the semiconductor device, it is difficult to externally change the cycle of the pulse. Thus, the tamper resistance is considerably improved.

Embodiment 2

Figure 6:
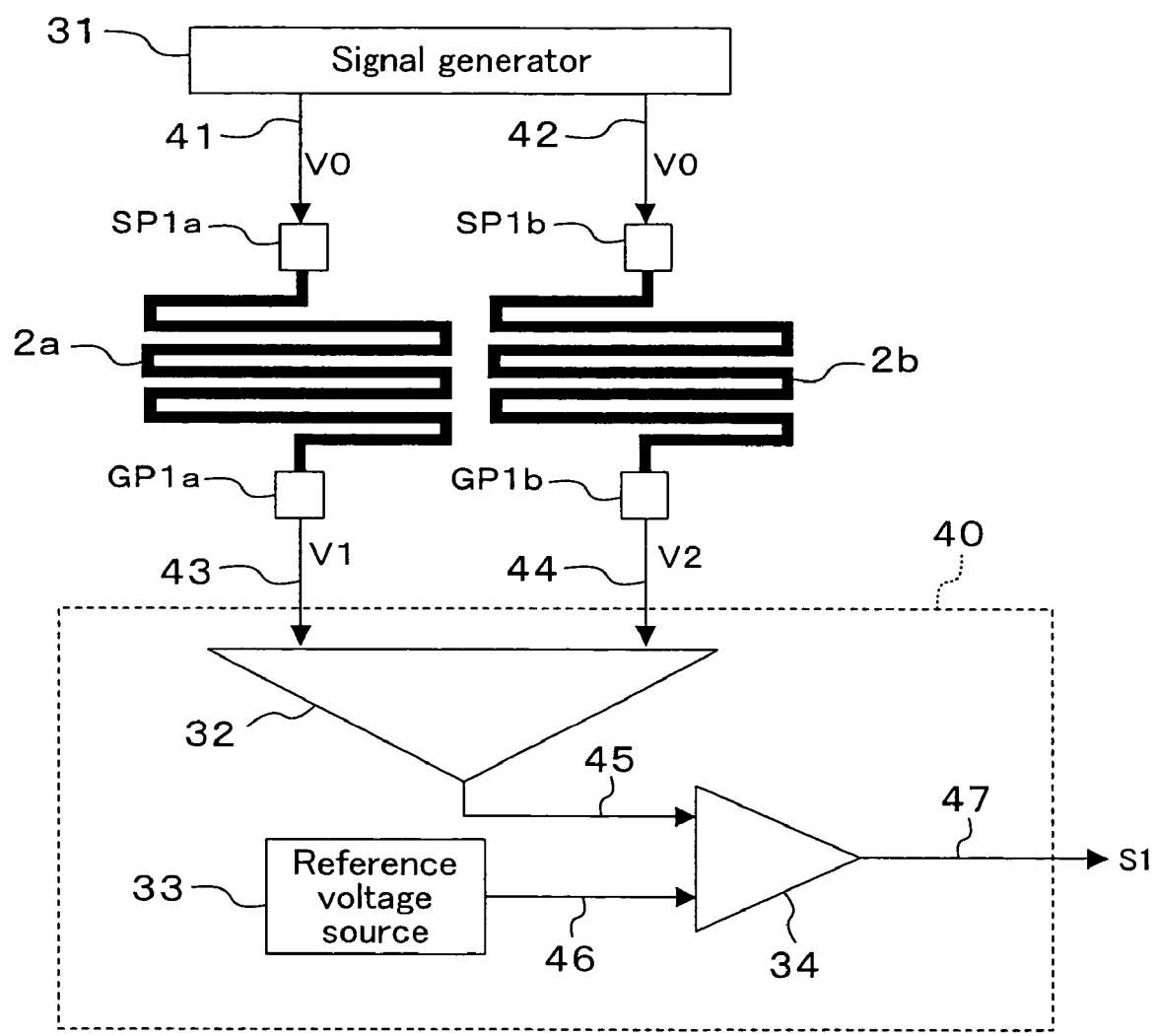
FIG. 6 shows the structure of a protection circuit according to embodiment 2.

FIG. 6 shows the structure of a protection circuit according to embodiment 2. The protection circuit is incorporated in a semiconductor device for protecting confidential information stored in the semiconductor device from an analytic activity committed through fraudulent means. The protection circuit of embodiment 2 includes a signal generator 31, a shielded line pair (2a, 2b), and a detector 40. The detector 40 includes an operational amplifier 32, a reference voltage source 33 and a comparator 34.

The shielded line pair (2a, 2b) is the uppermost layer made of a metal and is provided to cover a necessary and sufficient semiconductor device area to be protected (protection area). The shielded lines 2a and 2b have the same shape and the same length. The shielded line 2a is arranged based on a unicursal topology to have only one course from a start point SP1a to an end point GP1a. The shielded line 2b is arranged based on a unicursal topology to have only one course from a start point SP1b to an end point GP1b. The signal generator 31 supplies voltage V0 to the start points (SP1a, SP1b) of the shielded line pair (2a, 2b). The operational amplifier 32 amplifies the difference between voltage V1 at the end point GP1a of the shielded line 2a and voltage V2 at the end point GP1b of the shielded line 2b and outputs the amplified difference. The reference voltage source 33 outputs a reference voltage at a predetermined level. The comparator 34 compares the output of the operational amplifier 32 with the reference voltage from the reference voltage source 33 and outputs fraud detection signal S1 according to a result of the comparison.

The cross-sectional structure of a semiconductor device incorporating the protection circuit of FIG. 6 is generally the same as that shown in FIG. 2. The shielded line pair (2a, 2b) shown in FIG. 6 is included in the shield wiring layer 23 and arranged so as to cover a protection region 24 (including the device element(s) 21 and the wiring layers 22). The circuit elements that constitute the signal generator 31, the operational amplifier 32, the reference voltage source 33 and the comparator 34 shown in FIG. 6 are formed by the device element(s) 21, and lines 41 to 47 (FIG. 6) are formed by the wiring layers 22.

Next, the operation of the protection circuit having the above-described structure is described.

The signal generator 31 supplies certain voltage V0 to the start points (SP1a, SP1b) of the shielded line pair (2a, 2b). The operational amplifier 32 extracts an offset of the resistance characteristic of the shielded line pair (2a, 2b) in the form of a voltage, while the reference voltage source 33 generates a voltage corresponding to a production error, such as an initial offset of the operational amplifier 32 or the comparator 34, or the like, as a reference voltage. The comparator 34 compares the offset voltage (the output of the operational amplifier 32) with the reference voltage. If the offset voltage exceeds the reference voltage, the comparator 34 outputs fraud detection signal S1. With such a structure, embodiment 2 readily achieves tampering detection in the shielded line pair (2a, 2b).

As in embodiment 1, the number of shielded line pairs (2a, 2b) may be only one but alternatively may be more than one. Alternatively, a plurality of pairs of the operational amplifiers 32 and the comparators 34, each pair including one operational amplifier 32 and one comparator 34, are appropriately distributed in one shielded line pair (2a, 2b) such that a fraudulent activity based on external physical characteristic measurement is made difficult to improve the tamper resistance.

Figure 7:
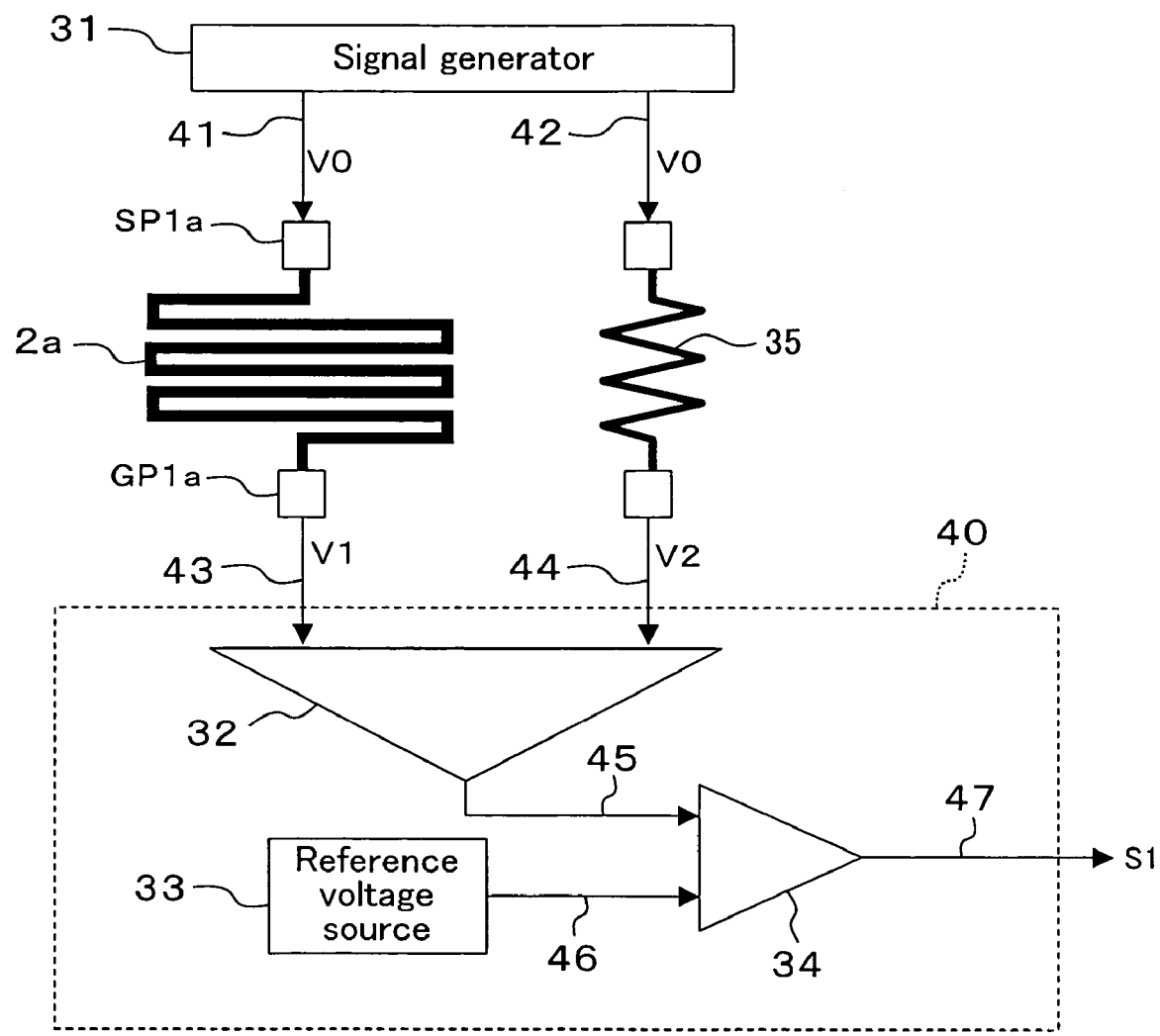
FIG. 7 shows a variation of the protection circuit of FIG. 6.

Alternatively, as shown in FIG. 7, a semiconductor resistor 35 may be provided in substitution for one of the shielded line pair (shielded line 2b). The semiconductor resistor 35 is provided in the protection region 24 shown in FIG. 2 and has the same resistance value as that of the shielded line 2a. In this way, the inputs to the operational amplifier 32 are supplied from a pair of the shielded line 2a and the semiconductor resistor 35 which has a resistance value as that of a route of the shielded line 2a and is protected by the shielded line 2a, whereby routing (arrangement) of the shielded line 2a becomes easier because it is not necessary to route (arrange) two lines to have the same shape and the same wiring length. The protection circuit shown in FIG. 6 is vulnerable to an accidental or intentional change of the shielded line pair (2a, 2b), e.g., re-connection of the shielded line pair (2a, 2b) to have such a route that a pair of two shielded lines (2a, 2b) have the same resistance characteristics. However, in the protection circuit shown in FIG. 7, one of the pair is the semiconductor resistor 35 protected by the shielded line 2a, and therefore, it is difficult to externally change the resistance value of the semiconductor resistor 35. Thus, a protection circuit having further improved protection effects can be provided.

Embodiment 3

Figure 8:
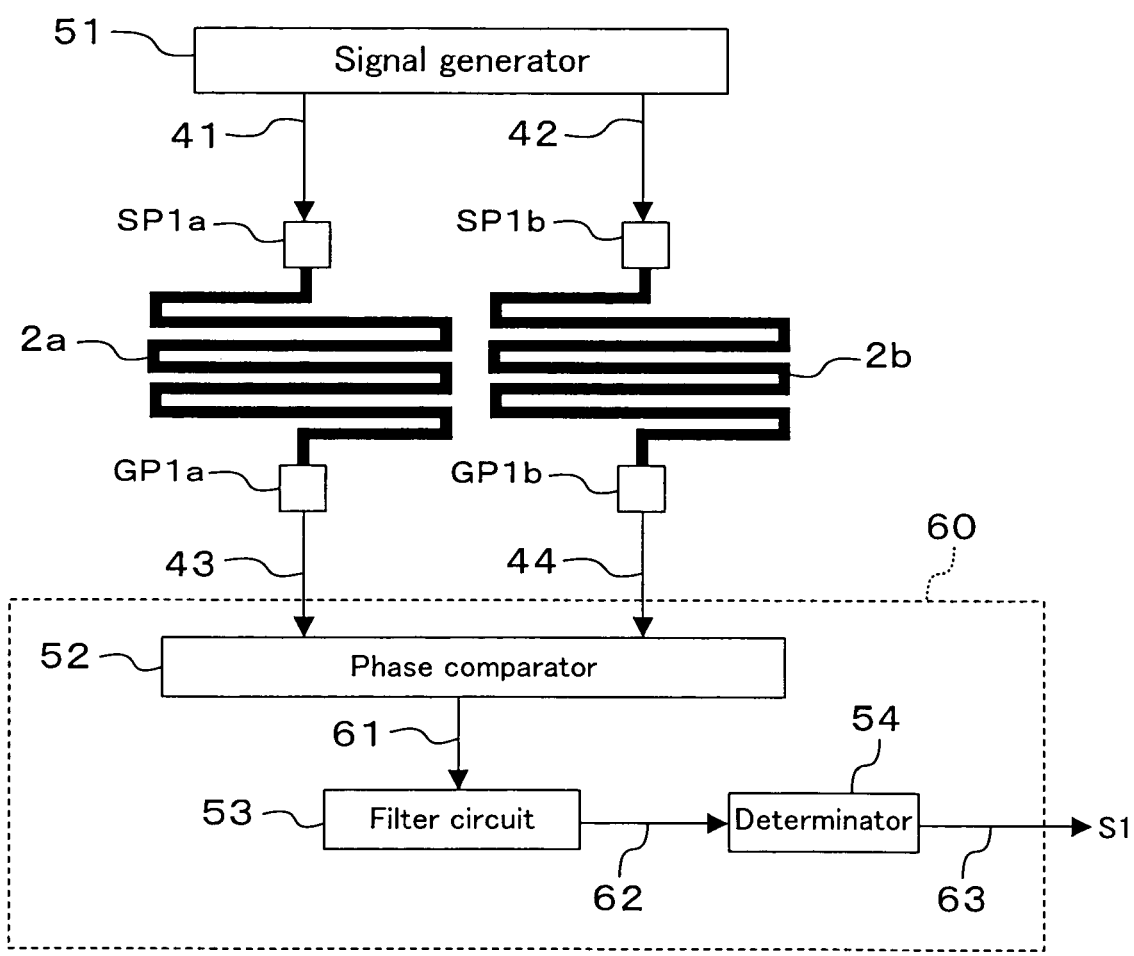
FIG. 8 shows the structure of a protection circuit according to embodiment 3.

FIG. 8 shows the structure of a protection circuit according to embodiment 3. The protection circuit is incorporated in a semiconductor device for protecting confidential information stored in the semiconductor device from an analytic activity committed through fraudulent means. The protection circuit of embodiment 3 includes a signal generator 51, a shielded line pair (2a, 2b), and a detector 60. The detector 60 includes a phase comparator 52, a filter circuit 53 and a determinator 54.

The cross-sectional structure of a semiconductor device incorporating the protection circuit of FIG. 8 is generally the same as that shown in FIG. 2. The shielded line pair (2a, 2b) shown in FIG. 8 is included in the shield wiring layer 23 and arranged so as to cover a protection region 24 (including the device element(s) 21 and the wiring layers 22). The circuit elements that constitute the signal generator 51, the phase comparator 52, the filter circuit 53 and the determinator 54 shown in FIG. 8 are formed by the device element(s) 21, and lines 41 to 44 and 61 to 63 (FIG. 8) are formed by the wiring layers 22.

Next, the operation of the protection circuit having the above-described structure is described.

Figure 9:
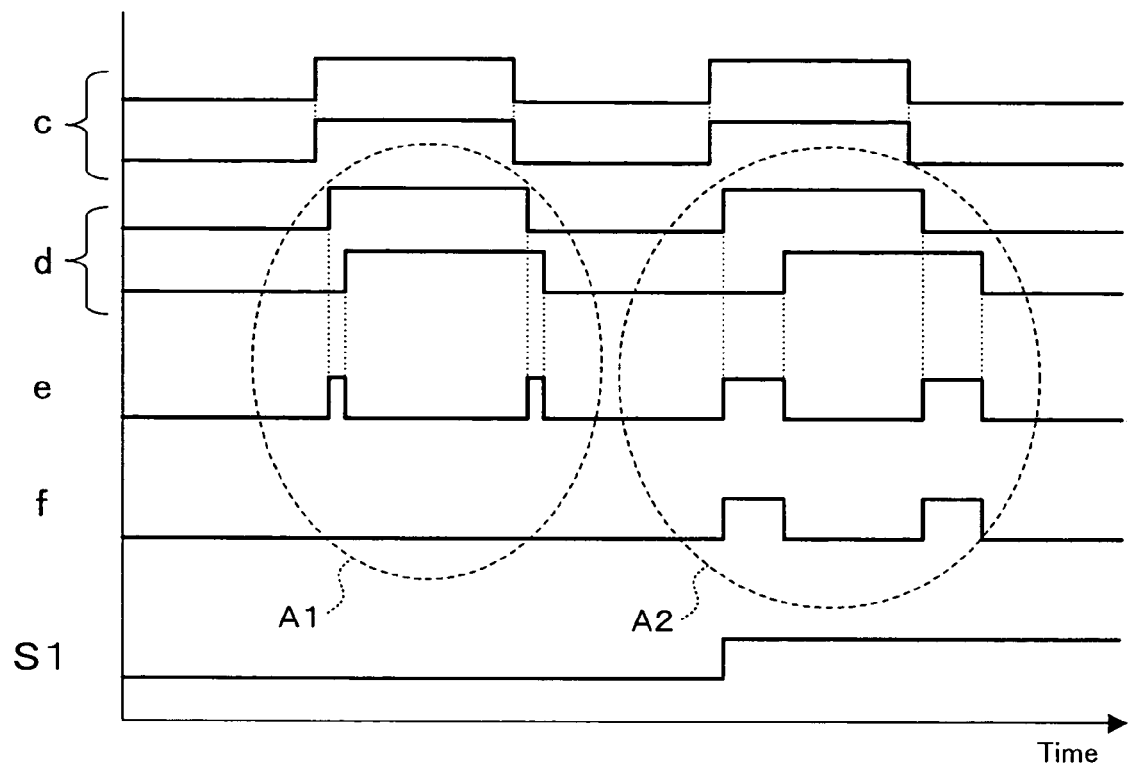
FIG. 9 is a timing chart illustrating the operation of the protection circuit of FIG. 8.

The signal generator 51 supplies in-phase pulses having a certain pulse width to the start points (SP1a, SP1b) of the shielded line pair (2a, 2b) at the same time. FIG. 9 shows a simplified waveform timing chart for the phase difference. In FIG. 9, lines c illustrate pulses input to the start points (SP1a, SP1b), lines d illustrate pulses obtained immediately before the phase comparator 52, line e illustrates the output of the phase comparator 52, and line f illustrates the output of the filter circuit 53. The phase comparator 52 extracts the phase difference between the pulses transmitted through the two shielded lines 2a and 2b. In encircled portion A1 of FIG. 9, a small phase difference (error) is seen between pulses d that are obtained immediately before the phase comparator 52. This phase difference is a result of a difference in the physical characteristics which is caused by a difference in the shape of protected semiconductor devices through which the shielded line pair (2a, 2b) passes. The difference in the shape of protected semiconductor devices is unavoidable in the production thereof. If the routes of the shielded line pair (2a, 2b) are tampered, the phase difference increases. After pulses d are transmitted through the phase comparator 52, a pulse having a pulse width corresponding to the phase difference is output from the phase comparator 52. If the shielded lines are normal, the output of the phase comparator 52 is a very short pulse (pulses of output e at encircled portion A1 of FIG. 9). If a route is tampered, the pulse width becomes large (pulses of output e at encircled portion A2 of FIG. 9). This pulse is input to the filter circuit 53 such that a short pulse caused by the initial phase difference is removed by a filtering function. Detecting a remaining pulse, the determinator 54 outputs fraud detection signal S1. As described above, embodiment 3 readily achieves tampering detection in the shielded line pair (2a, 2b).

As in embodiments 1 and 2, the number of shielded line pairs (2a, 2b) may be only one but alternatively may be more than one. Alternatively, a plurality of pairs of the phase comparator 52, the filter circuit 53 and the determinator 54, each pair including one phase comparator 52, one filter circuit 53 and one determinator 54, are appropriately distributed in one shielded line pair (2a, 2b) such that a fraudulent activity based on external physical characteristic measurement is made difficult to improve the tamper resistance.

Variation of Embodiments 1-3

Figure 10:
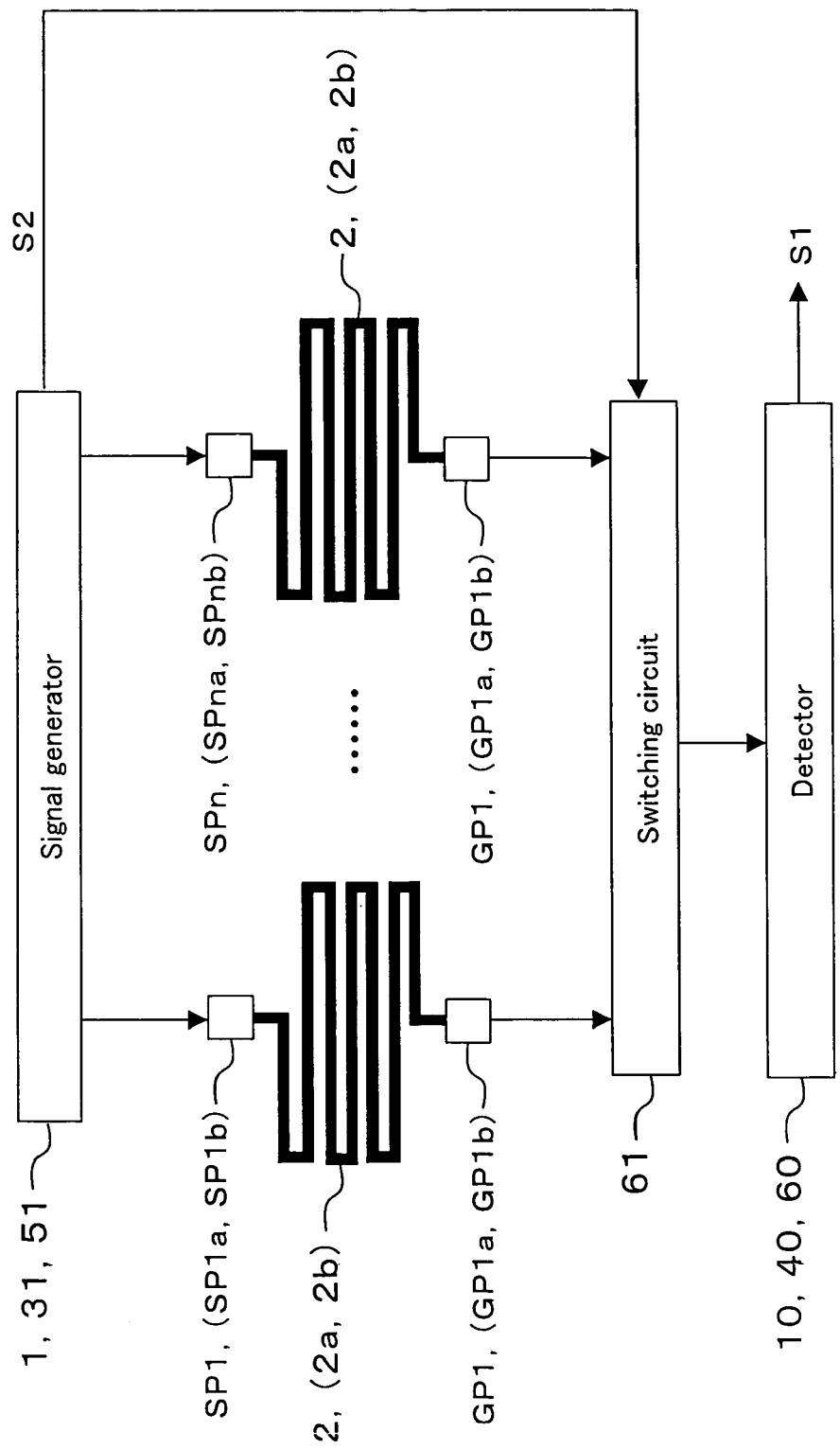
FIG. 10 shows a variation of embodiments 1-3.

FIG. 10 shows a variation of embodiments 1-3. A protection circuit shown in FIG. 10 includes a plurality of shielded lines 2 or a plurality of shielded line pairs (2a, 2b). The signal generator 1, 31 or 51 is connected to the start points SP1 to SPn of the plurality of shielded lines 2 or the start points SP1a and SP1b to SPna and SPnb of the plurality of shielded line pairs (2a, 2b). A switching circuit 61 is connected to the end points GP1 to GPn of the plurality of shielded lines 2 or the end points GP1a and GP1b to GPna and GPnb of the plurality of shielded line pairs (2a, 2b). Any one of the detectors 10, 40 and 60 of embodiments 1-3 for one route is connected to the switching circuit 61. The switching circuit 61 connects each one of the shielded lines 2 or shielded line pairs (2a, 2b) to the detector 10, 40 or 60 on a one-route by one-route basis. Tampering of the shielded line route is monitored and assessed on a one-route by one-route basis. If a tampering is detected, fraud detection signal S1 is output from the detector. The signal generator 1, 31 or 51, the switching circuit 61 and the detector 10, 40 or 60 are protected by the shielded lines 2 or shielded line pairs (2a, 2b). The lines for connecting these elements are also protected by the shielded lines 2 or shielded line pairs (2a, 2b).

Next, the operation of the protection circuit having the above-described structure is described.

The signal generator 1, 31 or 51 supplies a true signal for route tampering detection to only one of the plurality of routes of the shielded lines 2 or shielded line pairs (2a, 2b) and meanwhile supplies a pseudo signal to the other routes. The switching circuit 61 connects the end of the route to which the true signal is supplied to any one of the detectors 10, 40 and 60 of embodiments 1-3 to perform tampering detection of the route. This process is repeated for all of the routes on a one-route by one-route basis. The signal generator 1, 31 or 51 supplies switch control signal S2 to the switching circuit 61 such that the switching circuit 61 operates in synchronization with the route to which the true signal is supplied. Thus, it is not necessary to provide the detector 10, 40 or 60 to every one of the plurality of routes of the shielded lines 2 or shielded line pairs (2a, 2b), and accordingly, an increase of the layout area is suppressed. Furthermore, ingeniously contriving generation of the pattern of a pseudo signal(s) for hiding a true signal makes it difficult to specify a signal through external signal observation on shielded lines. Therefore, a protection circuit having further improved tamper resistance is readily realized.

Embodiment 4

Figure 11:
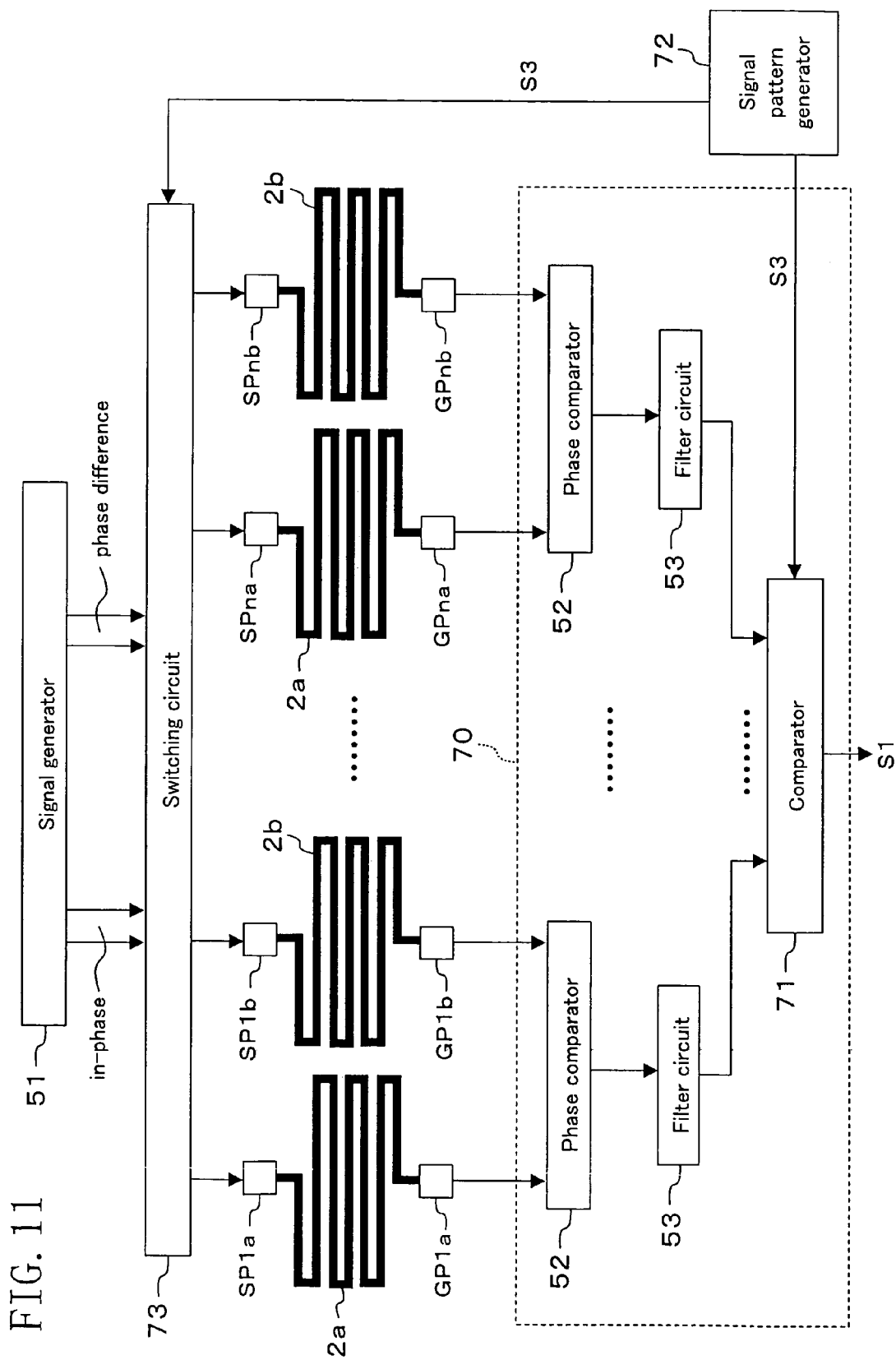
FIG. 11 shows the structure of a protection circuit according to embodiment 4.

FIG. 11 shows the structure of a protection circuit according to embodiment 4. The protection circuit of embodiment 4 includes a plurality of shielded line pairs (2a, 2b) (in this example, n shielded line pairs), a signal generator 51, a switching circuit 73, a signal pattern generator 72 and a detector 70. The detector 70 includes a plurality of phase comparators 52 (n phase comparators), a plurality of filter circuits 53 (n filter circuits) and a comparator 71.

The protection circuit of embodiment 4 has a plurality of shielded line pairs (2a, 2b) which are in the uppermost layer made of a metal in the production of a semiconductor device and are provided to cover a necessary and sufficient semiconductor device area to be protected. Each shielded line pair includes two shielded lines 2a and 2b having the same shape and the same length. The signal generator 51 is connected to the start points SP1a and SP1b to SPna and SPnb of the shielded line pairs (2a, 2b) through the switching circuit 73. The end points GP1a and GP1b to GPna and GPnb of the shielded line pairs (2a, 2b) are connected to the corresponding phase comparators 52. The outputs of the phase comparators 52 are supplied to the comparator 71 through the filter circuits 53. The signal pattern generator 72 supplies signal pattern S3 to the switching circuit 73 and the comparator 71 through lines protected by the shielded line pairs (2a, 2b). If the signals supplied from the filter circuits 53 do not match the signal pattern generated by the signal pattern generator 72, fraud detection signal S1 is output from the comparator 71. The signal generator 51, the switching circuit 73, the signal pattern generator 72 and the detector 70 are protected by the shielded line pairs (2a, 2b). The lines for connecting these elements are also protected by the shielded line pairs (2a, 2b).

Next, the operation of the protection circuit having the above-described structure is described.

The signal generator 51 selectively supplies a set of in-phase pulses and a set of pulses having a sufficient phase difference therebetween to the shielded line pairs through the switching circuit 73 according to signal pattern S3 received from the signal pattern generator 72. The set of in-phase pulses and the set of pulses having a sufficient phase difference are transmitted through the phase comparators 52 and the filter circuits 53 to be converted to signal patterns of 0 and 1. The resultant signal patterns are supplied to the comparator 71. Signal pattern S3 generated by the signal pattern generator 72 is sent as a reference signal to the comparator 71 through a line protected by the shielded line pairs (2a, 2b) for comparison with the signal patterns from the filter circuits 53. If the outputs of the filter circuits 53 do not match the reference signal from the signal pattern generator 72, the comparator 71 outputs fraud detection signal S1. With such a structure, embodiment 4 readily achieves tampering detection in the shielded line pairs (2a, 2b).

This protection circuit overcomes the vulnerability in phase difference detection to accidental or intentional application of external in-phase signals to all of the shielded lines. By employing a structure wherein signal pattern S3 is changed every time or a structure wherein the signal pattern generator 72 is formed by a random number generator, it becomes difficult to imitate signals on the shielded line pairs (2a, 2b) even if the signals can be externally observed. Thus, the tamper resistance is considerably improved.

Alternatively, in a possible application of embodiment 4, a signal supplied to the shielded line pairs (2a, 2b) is set to fixed potential Vss during the operation of the semiconductor device, and breaking/peeling of the shielded line pairs (2a, 2b) can be monitored all the time using the same detection method even during the operation, and even at the time other than start-up of the semiconductor device or the standby period. Thus, the tamper resistance is greatly improved.

Embodiment 5

Figure 12:
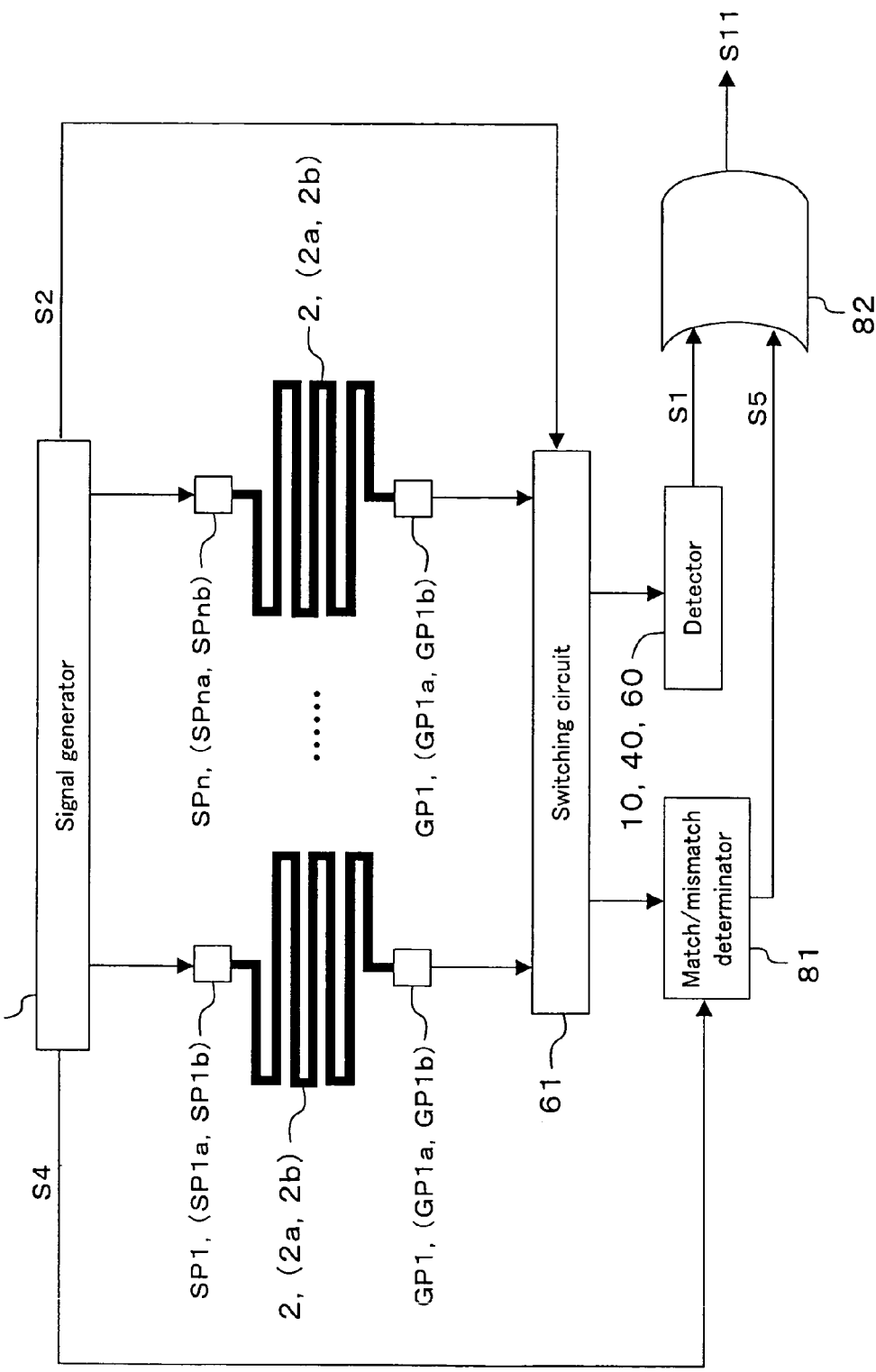
FIG. 12 shows the structure of a protection circuit according to embodiment 5.

FIG. 12 shows the structure of a protection circuit according to embodiment 5. The protection circuit of embodiment 5 includes a plurality of shielded lines 2 (in this example, n shielded lines) or a plurality of shielded line pairs (2a, 2b) (n shielded line pairs), a signal generator 1, 31 or 51, a switching circuit 61, a match/mismatch determinator 81, a detector 10, 40 or 60 and a OR circuit 82.

The protection circuit of embodiment 5 has a plurality of shielded lines 2 or a plurality of shielded line pairs (2a, 2b) which are in the uppermost layer made of a metal in the production of a semiconductor device and are provided to cover a necessary and sufficient semiconductor device area to be protected. The signal generator 1, 31 or 51 is connected to the start points of the shielded lines 2 or shielded line pairs (2a, 2b). The switching circuit 61 is connected to the end points of the shielded lines 2 or shielded line pairs (2a, 2b). The switching circuit 61 is also connected to any one of the detectors 10, 40 and 60 of embodiments 1-3 and the match/mismatch determinator 81. The signal generator 1, 31 or 51 and the match/mismatch determinator 81 are connected to each other by a line protected by the shielded lines. The match/mismatch determinator 81 determines the match/mismatch between the signals supplied to the match/mismatch determinator 81 to output fraud detection signal S5. Meanwhile, fraud detection signal S1 is output from the detector 10, 40 or 60. If a fraud is detected by any one of the match/mismatch determinator 81 and the detector 10, 40 or 60, fraud detection signal S11 is output from the OR circuit 82. The signal generator 1, 31 or 51, the switching circuit 61, the match/mismatch determinator 81, the detector 10, 40 or 60, and the OR circuit 82 are protected by the shielded lines 2 or shielded line pairs (2a, 2b). The lines for connecting these elements are also protected by the shielded lines 2 or shielded line pairs (2a, 2b).

Next, the operation of the protection circuit having the above-described structure is described.

The signal generator 1, 31 or 51 supplies a signal of 0 or 1 to each route of the shielded lines 2 or shielded line pairs (2a, 2b), and the supplied signal is transmitted to the match/mismatch determinator 81 through the switching circuit 61. Meanwhile, a comparison signal is supplied from the signal generator 1, 31 or 51 to the match/mismatch determinator 81 through a line protected by the shielded lines 2 or shielded line pairs (2a, 2b). The match/mismatch determinator 81 determines whether these signals match or mismatch each other. With this structure, abnormality in the shielded lines 2 or shielded line pairs (2a, 2b), such as breaking, peeling, or short-circuiting, is detected, and fraud detection signal S5 is output. Furthermore, comparison is repeated a plurality of times while the signal supplied from the signal generator 1, 31 or 51 is inverted or modified every time, whereby external observation of the signal and accidental coincidence with an externally supplied signal are prevented. Realizing the signal generator 1, 31 or 51 by a random number generator is desirable means for improving the tamper resistance. When no abnormality is detected by the above detection method, the switching circuit 61 is switched to use the detector 10, 40 or 60 for detecting a tampering of the shielded line routes. In abnormality is detected, the detector 10, 40 or 60 outputs fraud detection signal S1. If any one of fraud detection signals S1 and S5 is output, fraud detection signal S11 is output from the OR circuit 82. With the above features, embodiment 5 readily achieves tampering detection in the shielded lines 2 or shielded line pairs (2a, 2b). Further, since different detection means are used in combination, it is possible to prevent various types of fraudulent analytic activities. Thus, the tamper resistance is greatly improved.

Application of Embodiments 1-5

Figure 13:
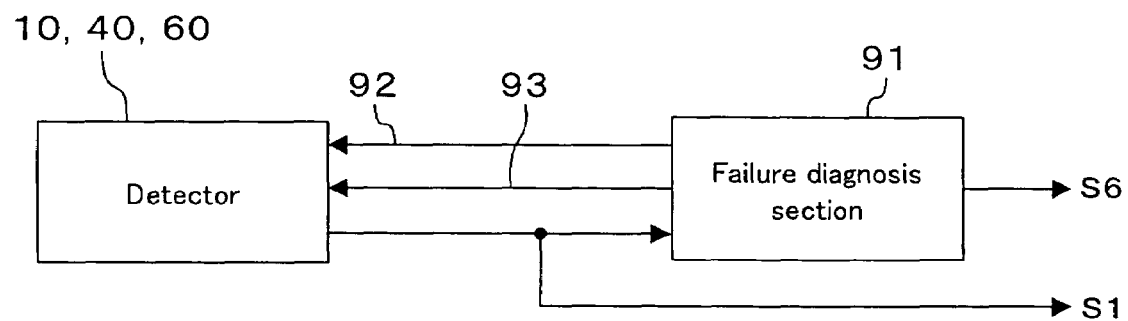
FIG. 13 shows a variation including a failure diagnosis section.
Figure 14:
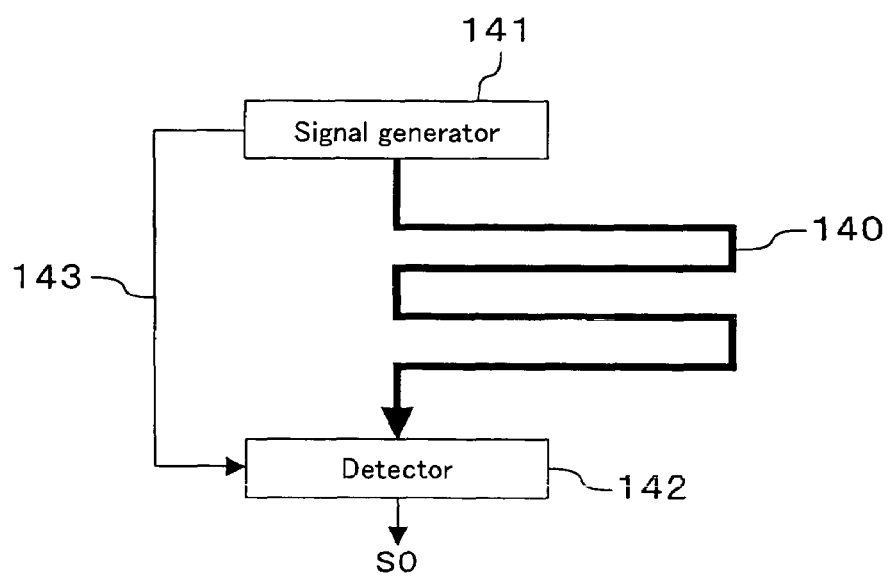
FIG. 14 shows the structure of a conventional protection circuit.

FIG. 13 shows an application of embodiments 1-5. It should be noted that FIG. 13 shows only a part of the structure of embodiments 1-5. In the application shown in FIG. 13, a failure diagnosis section 91 is connected to the detector 10, 40 or 60 of the protection circuit of embodiments 1-5 through lines protected by a shielded line (an input signal line 92, a control signal line 93, and a line for fraud detection signal S1). The detector 60 supplies fraud detection signal S1 to the failure diagnosis section 91. The failure diagnosis section 91 outputs failure detection signal S6 which indicates a result of failure diagnosis. The failure diagnosis section 91 is protected by the shielded line 2 or shielded line pair (2a, 2b).

Next, the operation of the protection circuit having the above-described structure is described.

The failure diagnosis section 91 sends several patterns of information that is to be determined as being abnormal or normal to the detector 10, 40 or 60 through the input signal line 92 on an abbreviated basis. Fraud detection signal S1 output from the detector 10, 40 or 60 is assessed by the failure diagnosis section 91. A failure of the detector 10, 40 or 60 or a fraudulent activity on the detector 10, 40 or 60 is detected by, for example, comparing an expected value obtained based on the information supplied to the detector 10, 40 or 60, and failure detection signal S6 is output from the failure diagnosis section 91. This failure diagnosis is performed before the tampering detection in the shielded line 2 or shielded line pair (2a, 2b). If no failure is detected, the process advances to the tampering detection in the shielded line 2 or shielded line pair (2a, 2b). If a failure is detected, the operation of the semiconductor device is immediately stopped. For example, in view of safety, important information, such as memory information, or the like, is deleted such that it never operates again. With the above features, it is possible to realize a protection circuit having improved tamper resistance which exhibits the protective effects against such a fraudulent activity that a node of fraud detection signal S1 in the protection circuit is specified, a shielded line or shielded line pair is peeled, and a fixed potential is applied to the node.

Next, semiconductor devices incorporating the protection circuits of all of the above embodiments are described.

The protection circuits of embodiments 1 and 3 perform a detection operation at the start-up of the semiconductor device and at a time when the semiconductor device is on standby but otherwise supplies to a shielded line(s) a fixed potential that causes the minimum effect to the operation of the semiconductor device. In embodiment 2, a shield line is supplied with a fixed potential from a signal generator in a detection operation, and therefore, monitoring of the shielded line and detection of tampering are possible all the time. In embodiment 4, the detection operation is performed at the start-up of the semiconductor device and at a time when the semiconductor device is on standby, but otherwise, a signal supplied to the shielded line is set to fixed potential Vss, whereby an abnormality, such as breakage/peeling of the shielded line, can be detected during operation by the same detection operation. In embodiment 5, the detection operation is performed at the start-up of the semiconductor device and at a time when the semiconductor device is on standby, but during the other operations, the signal supplied to the shielded line is set to fixed potential Vss or Vdd. In the detection operation which uses a match/mismatch determinator, breakage/peeling of the shielded line can be monitored all the time, and fixed potentials Vss and Vdd are randomly selected at every transition from the standby state to the active state, whereby monitoring can be performed all the time even if the semiconductor device is forced to malfunction and the detection operation at the start-up time and the standby period is ingeniously avoided. Thus, the tamper resistance can be improved. Control is performed based on fraud detection signals output from these protection circuits to prevent fraudulent analysis and tampering of information in a semiconductor device. For example, important data to be protected is deleted from a memory, and the operation of the semiconductor device is disabled such that it cannot be restarted. However, a protection circuit which detects a tampering of a shielded line route monitors a variation in the physical characteristics of the shielded line and therefore can estimate the possibility of erroneous detection caused by some external factor, such as an abrupt variation of the operating environment, or the like. Thus, the operation proceeds to the reset state or a fixed mode, which can be recovered when the power supply is interrupted and, for example, detection of fraud is stored in a nonvolatile memory as detection number information only when a tampering of the shielded line route is detected several times in series. Then, the semiconductor device is restarted, and the operation returns from the reset state or the fixed mode. If no fraud is detected, information stored in the nonvolatile memory is deleted. If a fraud is detected again, the process of updating the number of times for the detection number information and re-storing the updated number in the nonvolatile memory is performed. If such an operation is repeated and the number of times of detection exceeds a predetermined number of times, totally unrecoverable data, e.g., important data to be protected, is deleted from the memory, or the operation of the semiconductor device is disabled, such that it cannot be restarted. Such embodiment is more practical.

INDUSTRIAL APPLICABILITY

According to the present invention, a protection circuit with higher tamper resistance, which has the function of detecting a tampering of a shielded line which covers a semiconductor device, is readily realized. With this protection circuit incorporated, a semiconductor device with improved secrecy, wherein confidential information stored in the semiconductor device is protected from fraud analytic means, is readily provided.

What is claimed is:

1. A protection circuit, comprising:
    at least one shielded line arranged to cover an area to be protected over a semiconductor device, the at least one shielded line having only one route from a start point to an end point;
    a signal generator for applying a signal to the start point of the shielded line;
    a counter which starts measurement of time in response to application of the signal to the start point of the shielded line by the signal generator and which ends measurement of the time in response to arrival of the signal at the end point of the shielded line; and
    a comparator for comparing the time measured by the counter with a reference value to output a fraud detection signal according to a result of the comparison,
    wherein the reference value is the time measured by the counter during a period when the shielded line is in a normal state.

2. A protection circuit, comprising:
    at least one shielded line arranged to cover an area to be protected over a semiconductor device, the at least one shielded line having only one route from a start point to an end point;
    a signal generator for applying a signal to the start point of the shielded line;
    a counter which starts measurement of time in response to application of the signal to the start point of the shielded line by the signal generator and which ends measurement of the time in response to arrival of the signal at the end point of the shielded line; and
    a comparator for comparing the time measured by the counter with a reference value to output a fraud detection signal according to a result of the comparison,
    wherein the counter performs the measurement of the time by counting a clock pulse output from an oscillator provided in the area to be protected over the semiconductor device.

3. A protection circuit, comprising:
    at least one shielded line arranged to cover an area to be protected over a semiconductor device, the at least one shielded line having only one route from a start point to an end point;
    a signal generator for applying a signal to the start point of the shielded line;
    a counter which starts measurement of time in response to application of the signal to the start point of the shielded line by the signal generator and which ends measurement of the time in response to arrival of the signal at the end point of the shielded line; and
    a comparator for comparing the time measured by the counter with a reference value to output a fraud detection signal according to a result of the comparison,
    wherein;
        the protection circuit includes a plurality of said shielded lines;
        the signal generator applies a signal to a start point of one of the plurality of shielded lines; and
        the protection circuit further includes a switching circuit for notifying the counter about arrival of the signal at the end point of the shielded line to which the signal has been applied.

4. A protection circuit, comprising:
    at least one shielded line arranged to cover an area to be protected over a semiconductor device, the at least one shielded line having only one route from a start point to an end point;
    a signal generator for applying a signal to the start point of the shielded line;
    a counter which starts measurement of time in response to application of the signal to the start point of the shielded line by the signal generator and which ends measurement of the time in response to arrival of the signal at the end point of the shielded line;

a comparator for comparing the time measured by the counter with a reference value to output a fraud detection signal according to a result of the comparison; and a signal line in the area to be protected over the semiconductor device, wherein;

the signal generator applies a signal to the start point of the shielded line and an end of the signal line; and the protection circuit further includes a determination circuit for comparing the signal arriving at the end point of the shielded line and the signal arriving at the other end of the signal line to output a fraud detection signal according to a result of the comparison.

5. The protection circuit of claim 4, wherein the signal generator includes a random number generator.

6. A protection circuit, comprising:

at least one shielded line arranged to cover an area to be protected over a semiconductor device, the at least one shielded line having only one route from a start point to an end point;

a signal generator for applying a signal to the start point of the shielded line;

a counter which starts measurement of time in response to application of the signal to the start point of the shielded line by the signal generator and which ends measurement of the time in response to arrival of the signal at the end point of the shielded line;

a comparator for comparing the time measured by the counter with a reference value to output a fraud detection signal according to a result of the comparison; and a failure diagnosis section for applying to the comparator a test signal in substitution for the time measured by the counter and comparing a signal output from the comparator according to the applied test signal with an expected value to output a failure detection signal according to a result of the comparison.

7. A semiconductor device including a protection circuit, said protection circuit comprising:

at least one shielded line arranged to cover an area to be protected over a semiconductor device, the at least one shielded line having only one route from a start point to an end point;

a signal generator for applying a signal to the start point of the shielded line;

a counter which starts measurement of time in response to application of the signal to the start point of the shielded line by the signal generator and which ends measurement of the time in response to arrival of the signal at the end point of the shielded line; and a comparator for comparing the time measured by the counter with a reference value to output a fraud detection signal according to a result of the comparison, wherein the semiconductor device shifts in response to the fraud detection signal to a mode in which fraudulent analysis and tampering of information are disabled.

8. A semiconductor device including a protection circuit, said protection circuit comprising:

at least one shielded line arranged to cover an area to be protected over a semiconductor device, the at least one shielded line having only one route from a start point to an end point;

a signal generator for applying a signal to the start point of the shielded line;

a counter which starts measurement of time in response to application of the signal to the start point of the shielded line by the signal generator and which ends measurement of the time in response to arrival of the signal at the end point of the shielded line; and a comparator for comparing the time measured by the counter with a reference value to output a fraud detection signal according to a result of the comparison, wherein:

the semiconductor device shifts according to the fraud detection signal to a reset mode or fixed mode which is canceled when a power supply is interrupted; and if the fraud detection signal is output a predetermined number of times in series, the semiconductor device shifts to a mode in which fraudulent analysis and tampering of information are disabled.

* * * * *